United States Patent [19]

Dransfeld

[11] Patent Number: 4,785,437
[45] Date of Patent: Nov. 15, 1988

[54] PROCESS FOR READING-OUT INFORMATION FROM ELECTRICALLY POLARIZABLE DATA CARRIERS BY MEANS OF ELECTRON BEAMS

[75] Inventor: Klaus Dransfeld, Ermatingen, Switzerland

[73] Assignee: Bayer Aktiengesellschaft, Leverkusen, Fed. Rep. of Germany

[21] Appl. No.: 806,246

[22] Filed: Dec. 4, 1985

[30] Foreign Application Priority Data

Dec. 22, 1984 [DE] Fed. Rep. of Germany ....... 3447208

[51] Int. Cl.[4] .......................... G11B 9/02; G11B 9/10; G11B 11/08; G11B 13/04
[52] U.S. Cl. .................................... 369/13; 369/126; 365/118; 365/109
[58] Field of Search .................... 369/13, 126; 360/59, 360/114; 365/117, 118, 109, 122, 126, 65, 66

[56] References Cited

U.S. PATENT DOCUMENTS

| | | | |
|---|---|---|---|
| 2,698,928 | 1/1955 | Pulvari | 369/126 |
| 2,926,336 | 2/1960 | Chymoweth | 365/118 |
| 3,171,106 | 2/1965 | Lemmond | 365/126 |
| 3,478,334 | 11/1969 | Kump | 365/118 |
| 4,059,827 | 11/1977 | Byatt | 369/126 |
| 4,139,908 | 2/1979 | Brody | 369/13 |

OTHER PUBLICATIONS

Blanchard et al, IBM Tech. Dis. Bulletin, vol. 9 No. 12, May 1967, p. 1762.

Primary Examiner—Raymond F. Cardillo
Assistant Examiner—Hoa T. Nguyen
Attorney, Agent, or Firm—Sprung Horn Kramer & Woods

[57] ABSTRACT

The information recorded in the data carrier in the form of a locally variable electric polarization is scanned and selected by means of an electron beam. For this purpose, the secondary electrons produced on the surface of the data carrier are used. The data carrier is simultaneously either periodically heated by radiating electromagnetic waves or charged with ultrasonics. Potential fluctuations of equal frequency thereby arise on the surface of the data carrier dependent on local polarization, which fluctuations result in a modulation of the secondary electrons. The secondary electron flow thus receives information via the polarization conditions stored in the data carrier. To recover this information, the secondary electron flow is frequency-selectively amplified and electronically evaluated according to amount and/or phase. A polyvinylidene flouride film (PVDF) is preferably used as data carrier.

7 Claims, 1 Drawing Sheet

PROCESS FOR READING-OUT INFORMATION FROM ELECTRICALLY POLARIZABLE DATA CARRIERS BY MEANS OF ELECTRON BEAMS

BACKGROUND OF THE INVENTION

This invention relates to a process for reading-out information from a layered residually or remanent electrically polarized data carrier, corresponding to the recorded information in local domains by scanning the polarized domains by means of electron beams.

A substantial target of development in the area of data processing are information memories with high data capacity. Stationary electrically erasable memories on a silicon base with memory capacities of $10^6$ bit/cm$^2$ and movable magnetically erasable memories (such as a band, plate, or drum) of $10^7$ bit/cm$^2$ are presently commercially in use. However, memories with substantially higher storage capacities than $10^8$ bit/cm$^2$ are desired and in great demand.

In addition to the conventional, widespread semiconductor memories and magnetic memories, different processes, based on other physical principles, for recording and selecting information from data memories have already been examined and described. Thus, with multi-dimensional storage by means of laser holography or by means of photochemical hole-burning, the information is entered into the storage medium by a laser beam. Reading-out also takes place by a laser beam. A further direction of development is concerned with the use of electron beams for reading in and reading out. The electron beam has the advantage compared with the laser of a substantially lower beam diameter. A higher local dispersion and thus a higher storage capacity is thereby achieved. With this method, a non-erasable and read only memory has been recently produced by burning minute holes in aluminum foil.

As an analogy to the magnetic memory which is based on the magnetization of ferromagnetic domains, electrically polarizable media are already examined early on for suitability as solid-state memories. In U.S. Pat. No. 2,698,928, several basic processes for reading in and reading out information in or from residually electrically polarizable data carriers are described. The reading-in or writing takes place on a residually electrically polarizable data carrier which is provided with an electrically conductive base layer which is passed by an electrode which is charged with an electric potential corresponding to the information to be recorded. Alternatively, the information can also be entered into the polarizable medium by means of electron beams. An electron beam can also be used according to U.S. Pat. No. 2,698,928 for reading-out. Such a high field strength is produced in the polarized medium by the electron beam, that the polarized domains are reversed in polarity. During the reversing of the polarity, electric potentials are produced across electrodes, which potentials are detected as a read-out signal. In addition, the polarized data carrier can be charged with ultrasonic waves. The piezoelectric signal stored on the data carrier is then modulated with the ultrasonic frequency of the waves. In this case, the signal-to-noise ratio can be improved by frequency selective amplifiers.

This method of reading-out suffers from the disadvantage that the original polarization state and thus also the recorded information is erased by the relatively high field strength arising from the electron beam. Furthermore, the sensitivity leaves a lot to be desired; that is, it is difficult to achieve a sufficiently high signal-to-noise ratio.

A read-out process based on the principle of electron beam expansion is described in U.S. Pat. No. 4,059,827. The data carrier here is a ferroelectric polyvinylidene fluoride film. The read-out signal is produced by the metallized back layer of the data carrier being maintained at such a high negative potential, that the electron beam is diverted onto a grid-shaped collector electrode. If the data carrier is now electrically polarized corresponding to the recorded information, then the deflected beam is moved to the side or expanded, depending on the extent of the polarization charges. The information recorded in the form of a residual electric polarization can then be recovered again on the collector electrode in the form of an electric potential. This process suffers from the disadvantage that the data carrier must remain under high vacuum after entering the information and until read-out, since in air, a compensation of the polarization charges takes place immediately and thus the read-out is rendered more difficult or even impossible. Moreover, the strength of the read-out signal is greatly dependent on the geometry of the electrode, such that the spacial arrangement of the electrodes and the electron beam guns is very critical. This demands high precision when guiding the data carrier and in the arrangement of the read-out head. For these reasons, a high susceptance to disturbance is to be expected, especially when the process is optimized with respect to high sensitivity and high lateral resolution.

SUMMARY OF THE INVENTION

The object of the present invention is to improve the electron beam read-out process of an electrically polarizable data carrier with respect to the lateral resolution and the read-out speed. A resolution of $\leq 1$ μm and a data transfer rate of $\geq 10^6$ bit/sec should particularly be achieved during read-out. Moreover, a high signal-to-noise ratio should be guaranteed in this process from the start.

The object is achieved according to the invention by the following stages:
(a) The areas to be selected are periodically (activation frequency W) heated by radiating electromagnetic waves or are changed with ultrasonic waves,
(b) The secondary electrons reflected or scattered on the read-out areas are detected by a multiplier,
(c) The alternating voltage occurring on the multiplier is frequency-selectively amplified and evaluated according to the rate and/or phase position in relation to the activation frequency w.

By radiating electromagnetic waves, for example infrared light, which are modulated with the frequency w, the data carrier is heated on the surface according to the wavelength of the modulation frequency. The wavelength is specifically selected in the region of an absorption band of the data carrier material, such that the depth of penetration of the radiation is low and heating only takes place on the surface. The light source used for heating, for example a solid state laser with high frequency modulation is modulated with a frequency of <100 MHz. Potential fluctuations of equal frequency are thereby produced on the surface of the read-out areas by the heating and depending on the local polarization, which fluctuations result in a modulation of the secondary electrons and the resulting secondary electron flow thus contains information about the polarization conditions stored in the data carrier. With this method of read-out, a pyroelectric activation of the polarization domains takes place.

Alternatively, the polarized domains can also be piezoelectrically activated. For this purpose, the data carrier is specifically charged with ultrasonic waves via a piezoelectrically active layer applied thereon. The ultrasonic frequency is thereby advantageously in a range of from 0.5 to 5 GHz, preferably from 0.5 to 2 GHz.

The secondary electrons which are important for the read-out process are produced by a primary electron beam aimed at the data carrier with an energy of a few kV.

It has been discovered that the secondary electron detection represents a highly sensitive flow which allows high frequency potential fluctuations of a few mV to be established on the surface of the data carrier. Owing to the frequency selective amplification, only the high frequency modulated part of the secondary electrons is amplified and indicated with a favorable signal-to-noise ratio. The local dispersion during read-out is determined by the cross section of the primary electron beam. With optimal adjustment, a lateral resolution of $\leq 1$ $\mu$m can be achieved. In principal, an assumption is thereby made that with polarizable data carriers, information with a storage capacity of $\geq 10^8$ bit/cm$^2$ can be read-out.

Further important parameters of a data memory are then access time, the data transfer rate and the life of the stored information. In order to be able to achieve the required high data transfer rate without problems, the modulation frequency must be at least greater, by an order of magnitude, than the data transfer rate. With a data transfer rate of $10^6$ bit/sec, this is safely insured with an ultrasonic frequency of 1 GHz and with a laser modulation frequency of 10 MHz.

In relation to the known methods of electron beam readout, which lead to a reverse in the polarity of the polarized areas (see for example U.S. Pat. No. 2,698,928), the process according to the invention has the advantage that the alternating effect of the electron beam with the data carrier is so low that the polarization condition of the data carrier cannot be changed even with repeated read-out. The read-out process is always reversible.

The invention is described in more detail below by means of embodiments and drawings.

DETAILED DESCRIPTION OF THE INVENTION

Figure 1:
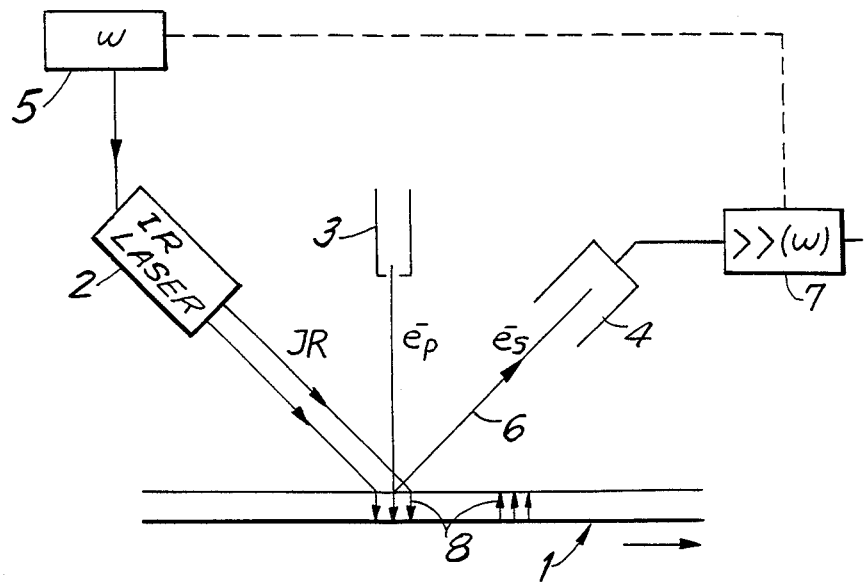
FIG. 1 shows an arrangement, in principle, for read-out by means of electron beams with pyroelectric activation of the polarized domains

According to FIG. 1, the layered data carrier 1 is passed by a fixed reading head 2, 3, 4. The layered data carrier consists of a suitable ferroelectric film, several $\mu$m in thickness, for example, a polyvinylidene fluoride film (PVDF). The reading head substantially consists of an IR laser 2, an electron beam gun 3 and a multiplier 4 for detecting secondary electrons, these elements all being arranged on the same side.

The PVDF layer 1 contains the stored information in the form of time-stable electrically polarized domains. The writing takes place in known manner by the signal field being impressed on the moving data carrier by means of a tip or by means of an electron beam (writing with a tip see U.S. Pat. No. 2,698,928 and H. Niitsuma and R. Sato, Ferroelectric Recording using the pyroelectric Reproduction Technique, Ferroelectrics, 34 (1981), pages 37-45). The entered residual polarization is, however, screened by free charge carriers (electrons and holes), such that if necessary, a very low electric field remains on the surface of the PVDF layer. For this reason, a rapid disturbance of the system must be carried out, which temporarily removes the screening action of the compensation-carrying charges and thereby produces a verifiable signal field. For this purpose, the PVDF layer is pyroelectrically activated during the read-out process. The pyroelectric activation here takes place by a laser beam (laser 2), which meets the surface of the data carrier 1 in a spacially restricted area. Since the spacial (lateral) resolution of the process is defined alone by the electron beam, the pyroelectric activation can take place on a relatively wide surface of the data carrier. The laser is modulated with a high frequency (high frequency generator 5). The surface of the data carrier 1 is heated by the laser beam according to the wavelength of the modulation frequency w. The signal field arising hereby is detected by a special electron probe which is described in more detail below. The electron probe consists of an electron gun 3 and produces a primary electron beam with an energy of from 1.5 to 2.5 kV which is aimed at the surface of the PVDF layer. If the primary electron beam meets a domain 8, which, as described above, is pyroelectrically activated, then the primary electon beam experiences an alternating effect with the surface charges produced by the activation in the rhythm of the modulation frequency w. With a collector 4 which is arranged in the vicinity of the PVDF layer 1, scattered or secondary electrons can be detected which are scattered or emitted on the surface. The collector 4, which in practice consists of a multiplier, is connected to a highly-sensitive narrow band amplifier 7 which is tuned to the frequency w. In this manner, only those electrons are detected on the receiver side which are influenced by the signal field of the PVDF layer. On the other hand, the alternating action of the primary electron beam with the polarized domains 8 is so weak that the polarization condition is not changed. The stored information remains unchanged.

The amplified read-out signal is passed to an evaluating circuit (not shown) which carries out a phase comparison with respect to the high frequency generator and/or an amplitude discrimination. If the primary electron beam meets successive opposed polarized domains 8, then the read-out signal changes its sign (phase jump of 180°). This fact can be used for selecting binary coded information. If, on the other hand, the recorded information consists of polarized areas of the same direction, but different amounts of polarization, then an analogous read-out is possible in which only the amplitudes of the read-out signal are evaluated.

The electron beam read-out must naturally take place under high vacuum. For this reason, the data carrier 1, the laser 2, the electron beam gun 3 and the multiplier 4 are situated in a high vacuum apparatus.

Figure 2:
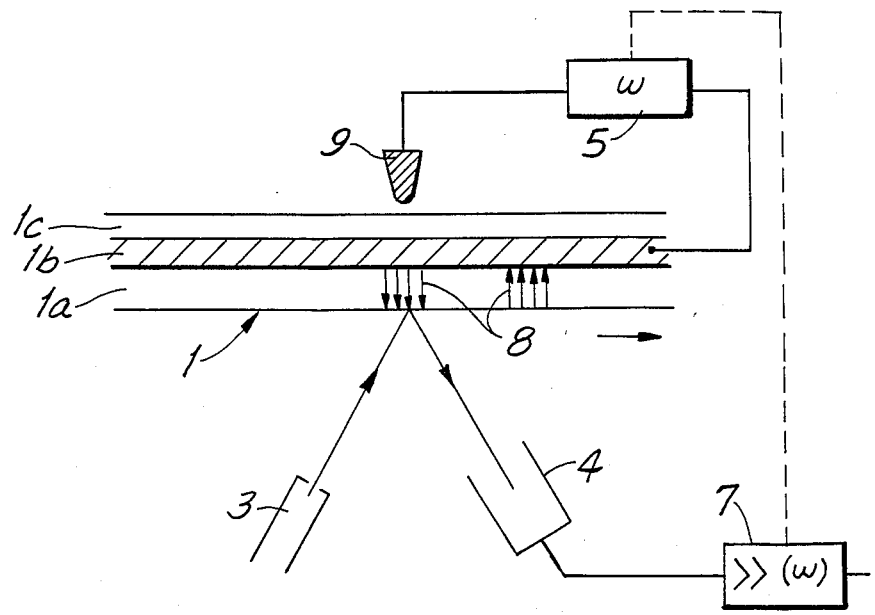
FIG. 2 shows an arrangement for electron beam read-out with piezoelectric excitation of the data carrier.

According to FIG. 2, the screening action of the compensation charges on the surface of the data carrier 1 is temporarily removed by a piezoelectric activation.

In contrast to the above-described embodiment, the data carrier 1 is here made up of three layers 1a, 1b, 1c. The first layer 1a is the storage layer consisting of a ferroelectric film, for example a PVDF film. The second layer 1b is a vapor-deposited aluminum layer for screening the PVDF film 1a. The third layer 1c is a piezoelectrically active layer and consists, for example, of zinc oxide or likewise of polarized polyvinylidene fluoride. It serves to produce the ultrasonic wave field, so as to activate the polarized domains 8 in the PVDF layer 1a. On the upper side of the piezo layer 1c, a metal electrode is arranged at a small spacing in the form of a tip 9. By applying a high frequency alternating voltage (UHF generator 5) to the tip 9 and the metallic intermediate layer 1b, the piezo layer 1c is excited in the area of the tip 9 to ultrasonic oscillations which are passed on to the underlying layers 1b and 1a. The polarized domains 8 are thereby, as explained above, activated and the resulting signal fields can be detected with the electron beam probe 3, 4 described below.

The exposure of the data carrier 1 to ultrasonic waves can also take place without the piezoelectric covering layer 1c. In this case, the ultrasonic waves are produced by the electrostatic forces occurring between the tip 9 and the metal layer 1b. The modulation frequency is then 2 w.

With the arrangements according to FIG. 1 and FIG. 2, the signal sensitivity can be improved when electron optics are incorporated in a known manner between the multiplier 4 and the PVDF layer so as to draw off as many secondary electrons as possible.

The electron beam probe 3, 4 can in principle be formed in a similar manner to known surface electron microscopes, that is, in the production of the process according to the invention, known technology can, by and large, be referred back to.

The process according to the invention is characterized by a favorable signal-to-noise ratio (high signal sensitivity), by a high lateral resolution (conditional on the minimum cross section of the primary electron beam) and by a high read-out speed. With respect to a high read-out speed, it is favorable if the ultrasonic frequency is selected as high as possible. A limit is occassionally set by space-charge and electron transit time effects between the multiplier 4 and the data carrier surface.

With further variants of the process derived from FIG. 1 or FIG. 2, a fixed data carrier 1 is used and the electron beam is scanned vertically with respect to the paper plane in FIG. 1 or FIG. 2. Moreover, the tip 9 in FIG. 2 can be replaced by a strip electrode which is vapor-deposited in the scanning direction. It is clear that with this variant, the mechanical expenditure is lower (since there is an elimination of the band transport device).

What is claimed is:

1. In a process for reading-out information from a layered, residually polarized data carrier corresponding to recorded information in local domains, including scanning the domains by an electron beam, the improvement comprising:

(a) periodically heating the areas to be read-out at an activation frequency by one of radiating electromagnetic waves and ultrasonic waves to activate the areas to produce potential fluctuations of equal frequency which modulate a secondary electron flow of secondary electrons corresponding to the polarization.

(b) detecting the secondary electrons emitted by the read-out areas by a multiplier and (c) frequencer selectively amplifying an alternating voltage occurring on the multiplier and evaluating the amplified voltage according to at least one of rate and phase position with respect to the activation frequency.

2. A process according to claim 1, wherein the areas to be read-out are activated by a pulsed IR-laser.

3. A process according to claim 1, wherein the data carrier is heated by ultrasonic waves using a piezoelectrically active layer connected thereto.

4. A process according to claim 1, wherein the data carrier is heated by ultrasonic waves using an electric alternating field impressed from the outside by a tip electrode.

5. A process according to claim 1, wherein the secondary electrons are detected by an attractive field and focused on the multiplier.

6. A process according to claim 3, wherein an ultrasonic frequency in a range of from 0.5 to 5 GHz and with primary electrons in an energy range of from 1 to 5 kV are used.

7. A process according to claim 6, wherein the ultrasonic frequency is from 0.5 to 2 GHZ and the primary electrons are in an energy range of from 1.5 to 2.5 KV.

* * * * *

UNITED STATES PATENT AND TRADEMARK OFFICE
CERTIFICATE OF CORRECTION

PATENT NO. : 4,785,437
DATED : November 15, 1988
INVENTOR(S) : Klaus Dransfeld

It is certified that error appears in the above-identified patent and that said Letters Patent is hereby corrected as shown below:

Col. 2, line 46  Delete "changed" and substitute --charged--

Col. 3, oine 3  Delete "polarization" and substitute --polarized--

Signed and Sealed this

Twenty-fourth Day of October, 1989

Attest:

DONALD J. QUIGG

Attesting Officer  Commissioner of Patents and Trademarks